United States Patent
Sim et al.

(10) Patent No.: US 11,693,569 B2
(45) Date of Patent: Jul. 4, 2023

(54) HOST PERFORMING AN EMBEDDING OPERATION AND COMPUTING SYSTEM INCLUDING THE SAME

(71) Applicant: SK hynix Inc., Icheon (KR)

(72) Inventors: Joon Seop Sim, Icheon (KR); Myung Hyun Rhee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/506,311

(22) Filed: Oct. 20, 2021

(65) Prior Publication Data

US 2022/0342569 A1 Oct. 27, 2022

(30) Foreign Application Priority Data

Apr. 22, 2021 (KR) .......................... 10-2021-0052490

(51) Int. Cl.
*G06F 3/06* (2006.01)

(52) U.S. Cl.
CPC .......... *G06F 3/0631* (2013.01); *G06F 3/0619* (2013.01); *G06F 3/0659* (2013.01); *G06F 3/0673* (2013.01)

(58) Field of Classification Search
CPC .... G06F 3/0631; G06F 3/0619; G06F 3/0659; G06F 3/0673
See application file for complete search history.

(56) References Cited

U.S. PATENT DOCUMENTS

2015/0042660 A1* 2/2015 Jain ....................... G06T 11/206 345/440
2017/0344369 A1* 11/2017 Cho ..................... G06F 9/30036
2021/0406266 A1* 12/2021 Chan ..................... G06N 3/0445
2022/0197540 A1* 6/2022 Sim ..................... G06F 12/0875

FOREIGN PATENT DOCUMENTS

| KR | 10-2015-0019359 A | 2/2015 |
| KR | 10-2017-0097626 A | 8/2017 |
| KR | 10-2019-0115402 A | 10/2019 |
| KR | 10-2020-0018188 A | 2/2020 |
| KR | 10-2020-0030082 A | 3/2020 |
| KR | 10-2020-0067603 A | 6/2020 |

OTHER PUBLICATIONS

Y. Kwon et al., "TensorDIMM: A Practical Near-Memory Processing Architecture for Embeddings and Tensor Operations in Deep Learning", 52nd IEEE/ACM International Symposium on Microarchitecture (MICRO-52), 2019.

\* cited by examiner

*Primary Examiner* — Sean D Rossiter

(57) ABSTRACT

A computing system capable of reducing data movement during an embedding operation and efficiently processing the embedding operation includes a host and a memory system. The host divides a plurality of feature tables, each including a respective plurality of embedding vectors for a respective plurality of elements, into a first feature table group and a second feature table group; generates a first embedding table configured of the first feature table group; and sends a request for a generation operation of a second embedding table configured of the second feature table group to the memory system. The memory system generates the second embedding table according to the generation operation request provided by the host. The host divides the plurality of feature tables into the first feature table group and the second feature table group based on the number of elements included in each of the plurality of feature tables.

17 Claims, 12 Drawing Sheets

HOST PERFORMING AN EMBEDDING OPERATION AND COMPUTING SYSTEM INCLUDING THE SAME

CROSS-REFERENCE TO RELATED APPLICATION

The present application claims priority under 35 U.S.C. § 119(a) to Korean patent application number 10-2021-0052490 filed on Apr. 22, 2021, in the Korean Intellectual Property Office, the entire disclosure of which is incorporated by reference herein.

BACKGROUND

1. Field of Invention

The present disclosure relates to an electronic device, and more particularly, to a host and a computing system including the same.

2. Description of Related Art

A storage device is a device that stores data under control of a host device such as a computer or a smartphone. The storage device may include a memory device storing data and a memory controller controlling the memory device. The memory device may be classified as a volatile memory device or a nonvolatile memory device.

The volatile memory device may be a device that stores data only when power is supplied and loses the stored data when the power supply is cut off. Volatile memory devices may include a static random access memory (SRAM), a dynamic random access memory (DRAM), and the like.

The nonvolatile memory device is a device that does not lose data even though power is cut off. Nonvolatile memory devices may include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a host capable of reducing an amount of data movement during an embedding operation and of efficiently processing the embedding operation, and a computing system including the same.

A computing system according to an embodiment of the present disclosure includes a host and a memory system. The host is configured to divide a plurality of feature tables into a first feature table group and a second feature table group, each feature table including a respective plurality of embedding vectors for a respective plurality of elements, generate a first embedding table configured of the first feature table group, and provide a request for a generation operation of a second embedding table configured of the second feature table group to the memory system. The memory system is configured to generate the second embedding table according to the request of the generation operation provided from the host. The host divides the plurality of feature tables into the first feature table group and the second feature table group based on the respective number of elements included in each of the plurality of feature tables.

A host according to an embodiment of the present disclosure includes an embedding table divider configured to divide a plurality of feature tables into a first feature table group and a second feature table group, each feature table including a respective plurality of embedding vectors for a respective plurality of elements, an embedding table manager configured to generate a first embedding table configured of the first feature table group, and an embedding operation controller configured to send request for a generation operation of a second embedding table configured of the second feature table group to a memory system. The embedding table divider divides the plurality of feature tables into the first feature table group and the second feature table group based on the number of elements included in each of the plurality of feature tables.

A computing system according to an embodiment of the present disclosure includes an embedding table divider configured to divide a plurality of feature tables into a plurality of feature table groups, each feature table including a respective plurality of embedding vectors for a respective plurality of elements, a plurality of operation processing devices each configured to generate an embedding table configured of any one of the plurality of feature table groups. The embedding table divider divides the plurality of feature tables into the plurality of feature table groups based on the number of elements included in each of the plurality of feature tables.

According to the present technology, a host capable of reducing an amount of data movement during an embedding operation and efficiently processing the embedding operation, and a computing system including the same are provided.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
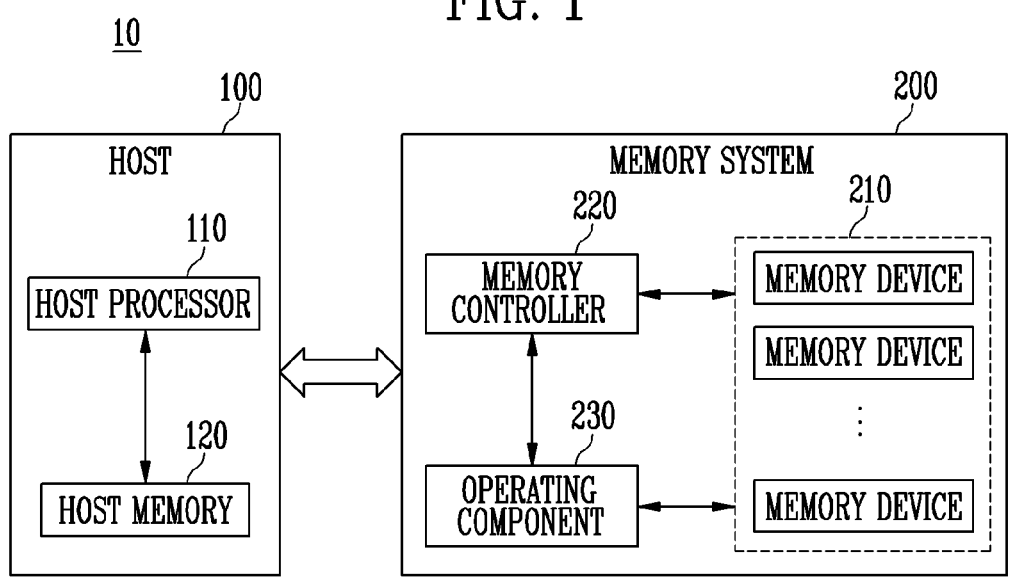
FIG. 1 illustrates an example of a computing system according to an embodiment of the present disclosure.

FIG. 1 illustrates an example of a computing system 10 according to an embodiment of the present disclosure.

The computing system 10 may include a host 100 and a memory system 200.

The host 100 may include a host processor 110 and a host memory 120.

The host processor 110 may include a circuit, interfaces, or program code for performing processing of data and for controlling operations of components of the computing system 10. For example, the host processor 110 may include a general-purpose processor such as a Central Processing Unit (CPU), an Applications Processor (AP), a digital signal processor (DSP), a graphic dedicated processor such as a Graphics Processing Unit (GPU), a vision processing unit (VPU), an artificial intelligence dedicated processor such as a Neural-network Processing Unit (NPU), or the like.

The host memory 120 may include an SRAM, a DRAM, or the like that stores data, commands, or program codes necessary for an operation of the computing system 10. In addition, the host memory 120 may also include a nonvolatile memory. In an embodiment, program codes operable to execute one or more operating systems (OSs) and virtual machines (VMs) may be stored in the host memory 120.

The host processor 110 may execute one or more OSs and VMs by executing the program codes stored in the host memory 120. In this way, the host processor 110 may control the operation of the components of the computing system 10.

The host 100 may communicate with the memory system 200 using at least one of various communication technologies such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM).

The memory system 200 may be a device that stores data under control of the host 100.

The memory system 200 may be manufactured as any one of various types of memory systems according to a communication protocol with the host 100. For example, the memory system 200 may be configured as any one of an SSD, a multimedia card in the form of an MMC, an eMMC, an RS-MMC or a micro-MMC, a secure digital card in the form of an SD, a mini-SD or a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The memory system 200 may be manufactured as any one of various types of packages. For example, the memory system 200 may be manufactured as any one of a package on package (POP), a system in package (SIP), a system on chip (SOC), a multi-chip package (MCP), a chip on board (COB), a wafer-level fabricated package (WFP), and a wafer-level stack package (WSP).

In an embodiment, the memory system 200 may be a pooled memory. The pooled memory may have a structure in which a plurality of memory devices are connected in parallel.

The memory system 200 may include a memory controller 220, an operating component 230, and a plurality of memory devices 210.

A memory device of the plurality of memory devices 210 may store data. The memory device 210 operates under control of the memory controller 220. The memory device 210 may include a memory cell array (not shown) including a plurality of memory cells that store data.

The memory device 210 is configured to receive a command and an address from the memory controller 220 and access an area selected by the address in the memory cell array. The memory device 210 may perform an operation instructed by the command on the area selected by the address. For example, in an embodiment wherein the memory device 200 includes non-volatile memory, the memory device 210 may perform a write operation (program operation), a read operation, and an erase operation. During the program operation, the memory device 210 may program data in the area selected by the address. During the read operation, the memory device 210 may read data from the area selected by the address. During the erase operation, the memory device 100 may erase data stored in the area selected by the address. Note that while embodiments described herein may describe the memory device 210 as non-volatile memory, embodiments are not limited thereto.

The memory controller 220 may control an overall operation of the memory system 200.

When power is applied to the memory system 200, the memory controller 220 may execute firmware (FW).

The memory controller 220 may control the memory device 210 to perform the program operation, the read operation, the erase operation, or the like according to a request of the host 100. During the program operation, the memory controller 220 may provide a write command, the address, and data to the memory device 210. During the read operation, the memory controller 220 may provide a read command and the address to the memory device 210. During the erase operation, the memory controller 220 may provide an erase command and the address to the memory device 210.

In an embodiment, the memory controller 220 may control at least two or more memory devices 210. In this case, the memory controller 220 may control the memory devices 210 according to an interleaving technology to improve operation performance. The interleaving technology may control respective operations for at least two memory devices 210 so that the operations overlap with each other.

The operating component 230 may perform a mathematical operation such as an addition operation, a multiplication operation, or both. For example, the operating component 230 may include computing circuitry for performing the mathematical operation.

In the illustrative embodiment shown in FIG. 1, the memory controller 220 and the operating component 230 are separate and independent devices, but embodiments are not limited thereto. For example, the operating component 230 may be implemented as part of the memory controller 220.

In an embodiment, the computing system 10 may be a device for providing a recommendation system. The recommendation system may recommend an item (for example, a movie, a music, news, a book, a product, or the like) that a user may be interested in based on information of the user. In an embodiment, the computing system 10 may provide the recommendation system using a recommendation model based on deep learning. The recommendation model may be a trained model that is trained using a plurality of training data sets. For example, the recommendation model based on deep learning may include a plurality of neural networks, and the plurality of neural networks may be trained using the plurality of training data sets. The neural network may include a plurality of layers. For example, the neural network may include an input layer, a hidden layer, and an output layer. In some embodiments, the neural network may include a plurality of hidden layers. The neural network including the plurality of hidden layers is referred to as a deep neural network, and training deep neural network is referred to as deep learning. Hereinafter, training the neural network may be understood as training a parameter of the neural network. In addition, the trained neural network may be understood as a neural network to which the trained parameter is applied.

In an embodiment, the recommendation system of the computing system 10 may be provided under the control of the host 100. For example, the host 100 may include the host processor 110 and the host memory 120. The host memory 120 may store an OS or an application program for providing the recommendation system.

Since the recommendation system based on deep learning performs memory-intensive embedding operations, the recommendation system may encounter a bandwidth problem: because a large amount of service data is required, a problem may occur when a capacity of the host memory 120 is insufficient. Therefore, in order to efficiently perform embedding, the computing system 10 may perform an embedding operation within the memory system 200.

In an embodiment, the host 100 may control the memory system 200 to obtain an embedding vector for target data, wherein the embedding vector is a vector that represents the target data and that may have a length equal to a system-determined dimension for embedding vectors. For example, the host 100 may request the embedding vector from the memory system 200. In an embodiment, the plurality of memory devices 210 may store an embedding table including a plurality of embedding vectors, each embedding vector in the table corresponding to a unique possible value for the target data. The memory system 200 may provide the embedding vector requested from the host 100 based on the embedding table.

The host 100 may perform various operations for outputting a recommendation result according to a preset algorithm using the embedding vector.

In addition, in an embodiment, the host 100 may store an embedding table in the host memory 120. The host 100 may obtain the embedding vector by performing the embedding operation based on the embedding table stored in the host memory 120.

In other words, the computing system 10 may divide an embedding table used for the embedding operation into a plurality of divided embedding tables and store each of the divided embedding tables in one of the host 100 and the memory system 200. For example, the computing system 10 may divide the embedding table into a first embedding table and a second embedding table, store the first embedding table in the host 100, and store the second embedding table in the memory system 200. Therefore, the computing system 10 may perform distributed processing of the embedding operation using the embedding table having a first portion stored in the host 100 and a second portion stored in the memory system 200.

Figure 2:
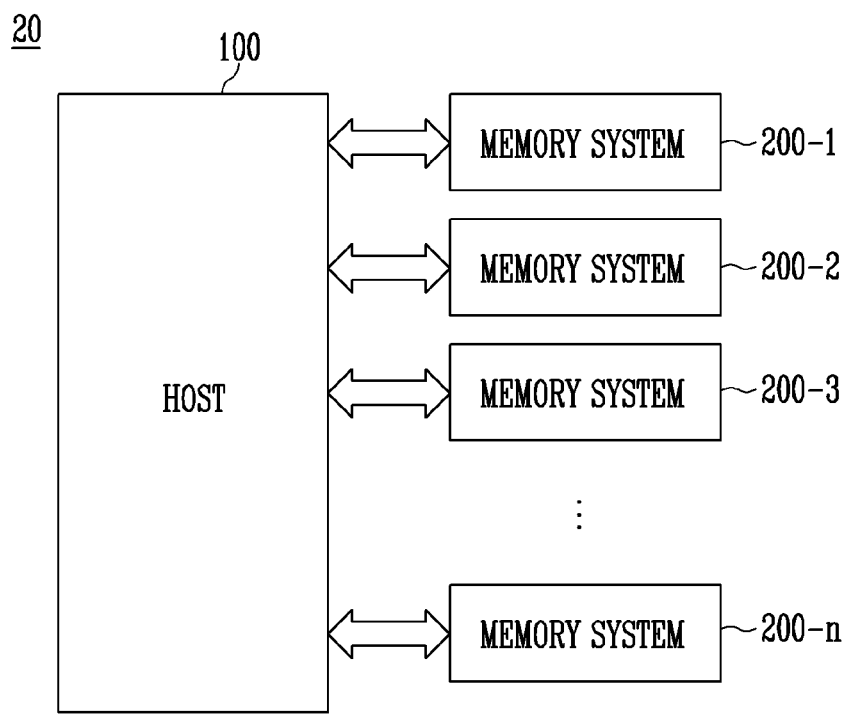
FIG. 2 illustrates another example of a computing system according to an embodiment of the present disclosure.

FIG. 2 illustrates another example of a computing system 20 according to an embodiment of the present disclosure.

The computing system 20 may include the host 100 and a plurality of memory systems 200-1 to 200-n.

For example, the computing system 20 may have a structure in which the host 100 is connected to the plurality of memory systems 200-1 to 200-n. In this example, the plurality of memory systems 200-1 to 200-n may indicate that the number of the memory systems 200 of FIG. 1 is plural.

The computing system 20 may divide the embedding table used for the embedding operation into a plurality of divided embedding tables, and store the divided embedding tables in the host 100 and the plurality of memory systems 200-1 to 200-n, respectively.

In an embodiment, the computing system 20 may divide the embedding table into the first embedding table and the second embedding table, store the first embedding table in the host 100, and store the second embedding table in the plurality of memory systems 200-1 to 200-n.

In another embodiment, the computing system 20 may divide the embedding table according to the number of the host 100 and the number of the plurality of memory systems 200-1 to 200-n, and store the divided embedding tables in the host 100 and the plurality of memory systems 200-1 to 200-n, respectively. For example, each of the host 100 and the plurality of memory systems 200-1 to 200-n may include one operation processing device (such as the host processor 110 or the operating component 230 shown in FIG. 1). In this case, the computing system 20 may divide a plurality of feature tables included in the embedding table into a plurality of feature table groups. Thereafter, each of the plurality of processing devices may generate an embedding table configured of a respective one of the plurality of feature table groups. Here, the plurality of processing devices may include the host 100 and the plurality of memory systems 200-1 to 200-n. An illustrative example of an operation in which the computing system 20 divides the plurality of feature tables into a plurality of feature table groups is described in detail with reference to FIG. 7.

Accordingly, the computing system 20 may perform distributed processing of the embedding operation using an embedding table stored in the host 100 and a plurality of embedding tables respectively stored in the plurality of memory systems 200-1 to 200-n.

Figure 3:
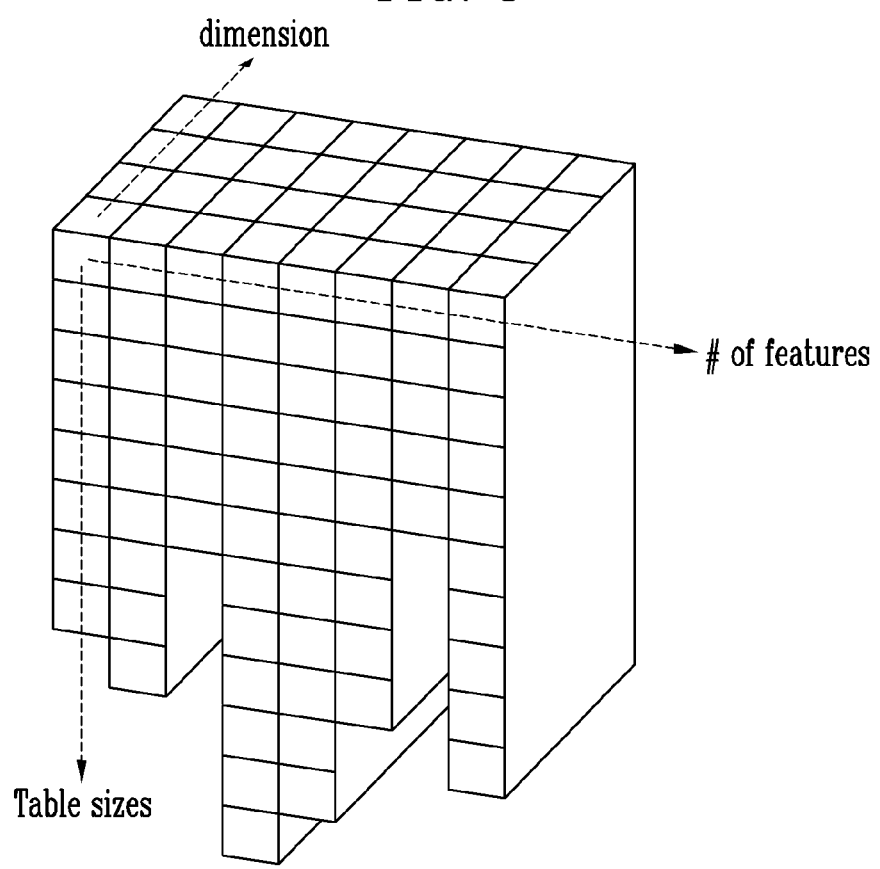
FIG. 3 illustrates an embedding table according to an embodiment of the present disclosure.

FIG. 3 illustrates an embedding table according to an embodiment of the present disclosure.

Referring to FIG. 3, the embedding table stored in the host 100 or the memory system 200 is shown.

The embedding table may include vector information obtained through embedding learning using a plurality of training data. For example, the embedding table may include vector information on items of a previously trained training model. Here, the training model may mean an artificial intelligence model, and the artificial intelligence model may be created through training. Specifically, the embedding table may be a collection of category data that may be classified into pairs of a category and an embedding vector corresponding thereto, and each training data may be the category data. The category data may be data produced by converting natural language data to a vector form including indications of mutual similarity using an embedding algorithm. For example, a vector may be a number set including several integers or floating point numbers such as '(3, 5)', '(0.1, −0.5, 2, 1.2)'. That is, the embedding table may mean the category data of the training model trained to be classified for each category and a set of vector information of the category data. When vector values such as a slope of the embedding vector and a shape of the embedding vector are similar, words corresponding to embedding vectors may be semantically similar.

Meanwhile, the category may be referred to as a 'feature', and the training data, category data, or item may be referred to as an 'element'.

According to an embodiment of the present disclosure, the embedding table may be configured with three dimensions. In the illustrative example of FIG. 3, the embedding table may be configured with three dimensions including 'Table sizes', '# of features', and 'dimension'. Here, the 'Table sizes' may mean the number of elements included in a specific feature. For example, when 'Harry Potter' and 'Shrek' are included in a feature of <movie name>, the number of elements may be two. Furthermore, '# of features' may mean the number of feature types. For example, when the embedding table includes <movie name> and <movie genre>, the number of feature types may be two. Finally, the 'dimension' may mean a dimension of the embedding vector. That is, the 'dimension' may mean the number of numbers included in the embedding vector. For example, if an illustrative embedding vector '(0.1, −0.5, 2, 1.2)' includes four numbers, the dimension of '(0.1, −0.5, 2, 1.2)' may be four.

Figure 4:
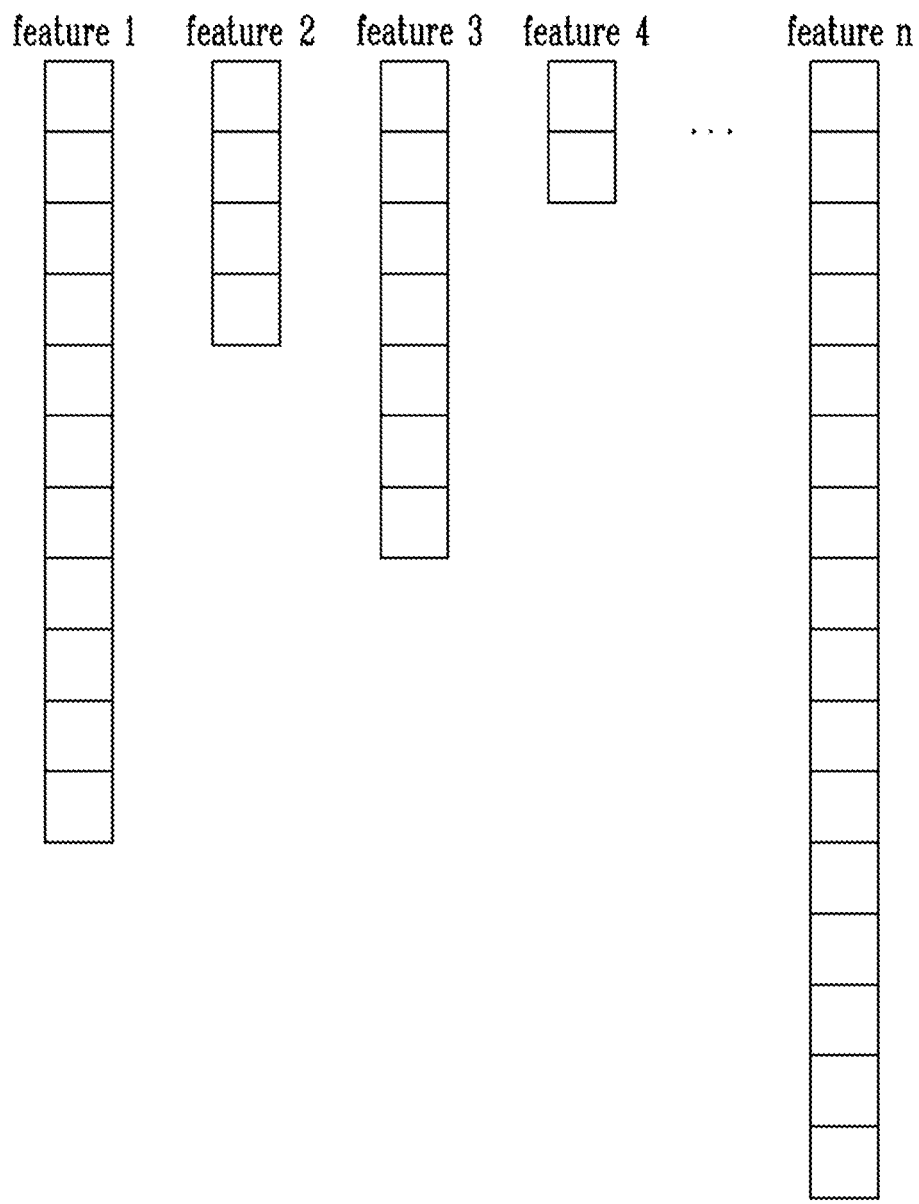
FIG. 4 illustrates a feature table according to an embodiment of the present disclosure.

FIG. 4 illustrates feature tables according to an embodiment of the present disclosure.

Referring to FIG. 4, an embedding table may include a plurality of feature tables feature 1 to feature n.

Each of the plurality of feature tables feature 1 to feature n may include a plurality of embedding vectors for a plurality of elements. Each of the feature tables feature 1 to feature n may include embedding vectors for elements included in a corresponding feature. For example, each of the feature tables feature 1 to feature n may include embedding vectors generated based on a similarity between the elements included in the corresponding feature. In an embodiment, the number of elements of each of the plurality of feature tables feature 1 to feature n may be different from each other. For example, the first feature table feature 1 may include embedding vectors for eleven elements, the second feature table feature 2 may include embedding vectors for four elements, the third feature table feature 3 may include embedding vectors for seven elements, and the fourth feature table feature 4 may include embedding vectors for two elements.

As the number of elements included in a feature table increases, the number of lookups for each element included in the feature table may decrease. In this case, the elements included in the corresponding feature table may have low temporal locality. Conversely, as the number of elements included in the feature table decreases, the number of lookups for each element included in the feature table may increase. In this case, the elements included in the corresponding feature table may have high temporal locality. Therefore, when the embedding operation is processed using a single processor without considering the temporal locality of the feature tables, inefficient memory access may occur. For example, when the embedding operation is processed in the host 100, because a CPU of the host 100 may have a multi-level cache hierarchy structure, it may be inefficient to process a feature table including elements having low temporal locality using the CPU. Conversely, it may be efficient to process a feature table including elements having high temporal locality using the CPU.

Therefore, according to an embodiment of the present disclosure, an efficient embedding operation in consideration of the temporal locality may be performed, by dividing the embedding table into a plurality of divided embedding tables and generating the divided embedding tables in the host 100 and the memory system 200, respectively.

Figure 5:
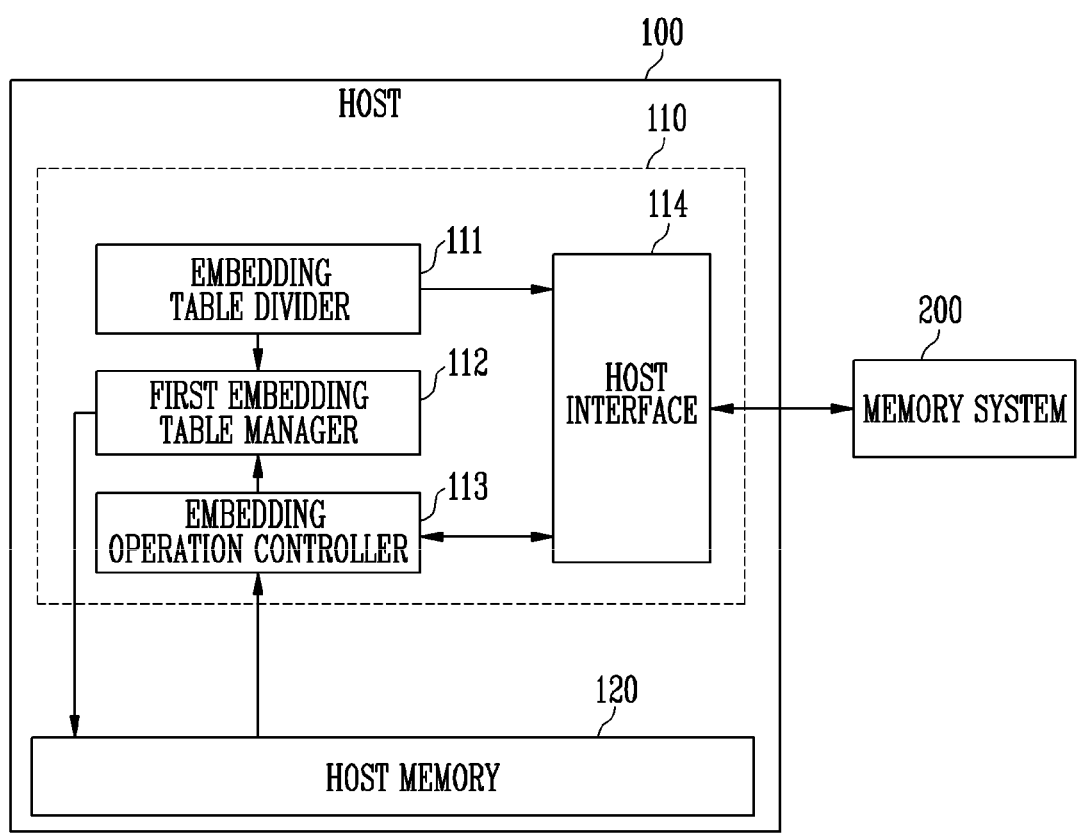
FIG. 5 illustrates a host according to an embodiment of the present disclosure.

FIG. 5 illustrates a host 100 according to an embodiment of the present disclosure.

The host 100 may include an embedding table divider 111, a first embedding table manager 112, an embedding operation controller 113, and a host interface 114.

The embedding table divider 111 may divide the embedding table. For example, the embedding table divider 111 may divide the plurality of feature tables included in the embedding table into a first feature table group and a second feature table group.

In an embodiment, the embedding table divider 111 may divide the plurality of feature tables into the first feature table group and the second feature table group based on the number of elements included in each of the plurality of feature tables.

The first embedding table manager 112 may generate the first embedding table configured of the first feature table group. In addition, the first embedding table manager 112 may update the first embedding table under control of the embedding operation controller 113.

The embedding operation controller 113 may control the embedding operation of the host 100 and the memory system 200. In an embodiment, the embedding operation may include an embedding table generation operation (or an initialization operation), an inference operation, and a training operation. The inference operation may be an operation of looking up the embedding vector from the embedding table. The training operation may be an operation of calculating a gradient and updating the embedding table. Here, the gradient may be data for updating the embedding table, and may be data including a weight.

In an embodiment, the embedding operation controller 113 may control the first embedding table manager 112 to generate the first embedding table. In addition, the embedding operation controller 113 may request that the memory system 200 perform the generation operation of the second embedding table configured of the second feature table group. For example, the embedding operation controller 113 may request the generation operation of the second embedding table by the memory system 200 through the host interface 114.

In an embodiment, the embedding operation controller 113 may obtain an embedding vector of a target element by performing the embedding operation based on the first embedding table, or may request the embedding vector of the target element from the memory system 200.

In an embodiment, the embedding operation controller 113 may update the first embedding table and the second embedding table based on a weight obtained through a embedding learning. For example, the embedding operation controller 113 may control the first embedding table manager 112 to update the first embedding table based on the weight. In addition, the embedding operation controller 113 may request that the memory system 200 perform an update operation of the second embedding table based on the weight.

Figure 6:
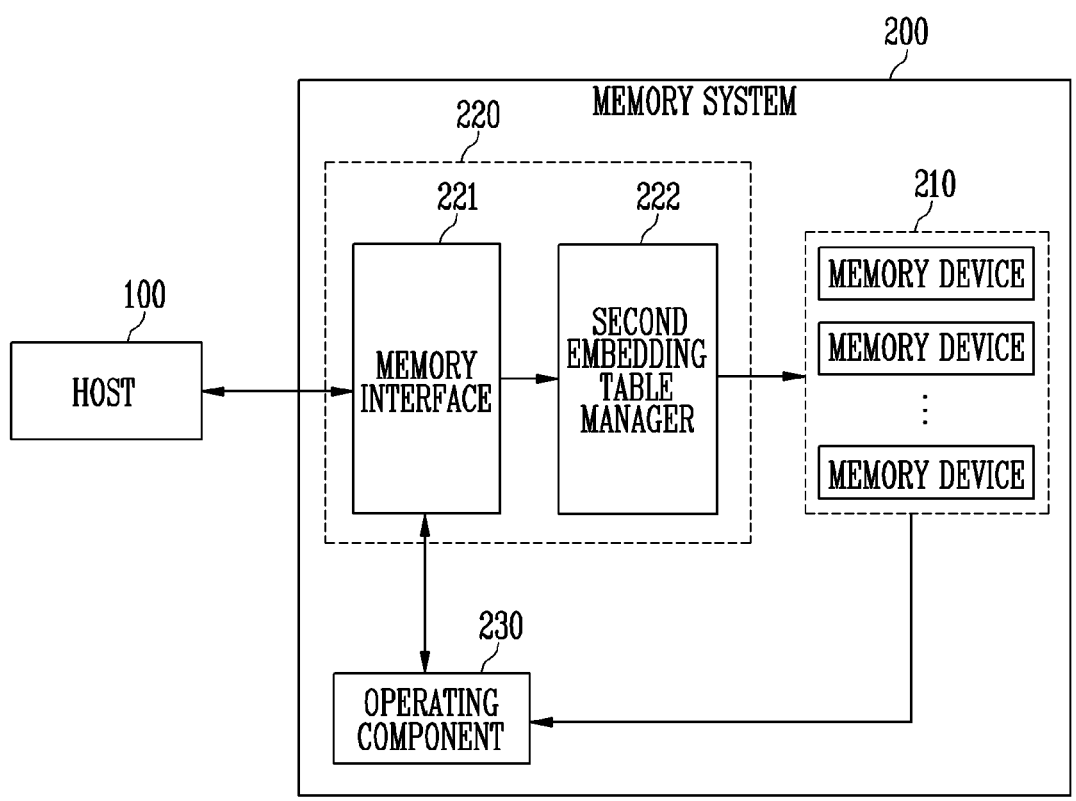
FIG. 6 illustrates a memory system according to an embodiment of the present disclosure.

FIG. 6 illustrates a memory system according to an embodiment of the present disclosure.

The memory controller 220, the operating component 230, and the plurality of memory devices 210 of FIG. 6 may respectively correspond to the memory controller 220, the operating component 230, and plurality of memory devices 210 of FIG. 1.

In an embodiment, the plurality of memory devices 210 may store the second embedding table.

The memory controller 220 may include a memory interface 221 and a second embedding table manager 222.

The memory interface 221 may relay a packet between the host 100 and the memory system 200. For example, the memory interface 221 may transmit requests received from the host 100 to the second embedding table manager 222 and the operating component 230. A communication process between the host 100 and the memory system 200 is described in detail with reference to FIG. 11.

The second embedding table manager 222 may generate the second embedding table. For example, the second embedding table manager 222 may control the plurality of memory devices 210 to allocate a memory area to store the second embedding table.

In an embodiment, the second embedding table manager 222 may update the second embedding table based on the weight according to an update request of the host 100.

In an embodiment, the operating component 230 may perform the embedding operation based on the second embedding table, and may provide the embedding data obtained through the embedding operation to the host 100 through the memory interface 221.

Figure 7:
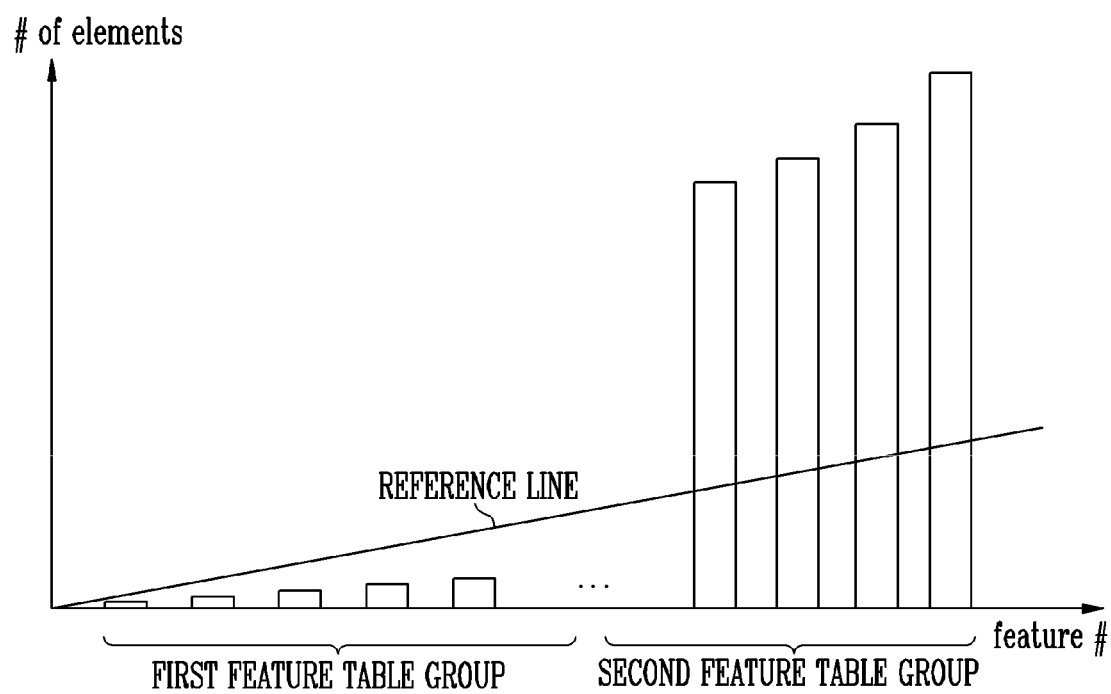
FIG. 7 illustrates an operation of dividing a plurality of feature tables according to an embodiment of the present disclosure.

FIG. 7 illustrates an operation of dividing a plurality of feature tables according to an embodiment of the present disclosure.

In a graph shown in FIG. 7, a vertical axis may represent the number of elements, and a horizontal axis may represent an order of the feature tables.

In an embodiment, the embedding table divider 111 may generate a reference line based on the number of plurality of feature tables and the number of all elements included in the plurality of feature tables. Here, the reference line may be produced according to an arithmetic average determined by using the number of the plurality of feature tables and the number of all elements. For example, the reference line may be calculated through Equation 1 below.

$$\text{slope} = \frac{\sum_{i=1}^{\# \text{ of features}} (\# \text{ of } Elements_i)}{\# \text{ of features}/2} \cdot 10^{-2} \quad \text{Equation 1}$$

In Equation 1, slope means a slope of the reference line, # of Element, means the number of elements in feature table i, and # of features means the number of feature tables. The sum on the top-most line therefore represents the total number of elements in all the feature tables, and the quotient of that sum divided by the # of features corresponds to the average number of elements in each feature table. The values "$10^{-2}$" and "2" in Equation 1 are selected according to a desired division of the plurality of feature tables into the first and second feature table groups. The value of the reference line for each feature corresponds to the slope times the index of that feature In an embodiment, the embedding table divider 111 may sort the plurality of feature tables in an ascending order based on the number of elements included in each of the plurality of feature tables. In addition, the embedding table divider 111 may divide the plurality of feature tables into the first feature table group and the second feature table group based on the reference line.

For example, the embedding table divider 111 may determine feature tables among the plurality of feature tables that include a number of elements below the reference line as being in the first feature table group. In addition, the embedding table divider 111 may determine feature tables among the plurality of feature tables that have a number of elements that falls above the reference line as being in the second feature table group. For example, in an embodiment, the value of the reference line for the $n^{th}$ feature is n times a slope of the reference line (where the slope is calculated using Equation 1), so if the number of elements in the $n^{th}$ feature table is less than n times the slope, the $n^{th}$ feature table is determined to be in the first feature table group, and if the number of elements in the $n^{th}$ feature table is greater than or equal to n times the slope, the $n^{th}$ feature table is determined to be in the second feature table group.

Meanwhile, the operation of dividing the plurality of feature tables described with reference to FIG. 7 is only an example. Therefore, the operation of dividing the plurality of feature tables may be various according to an embodiment.

Figure 8:
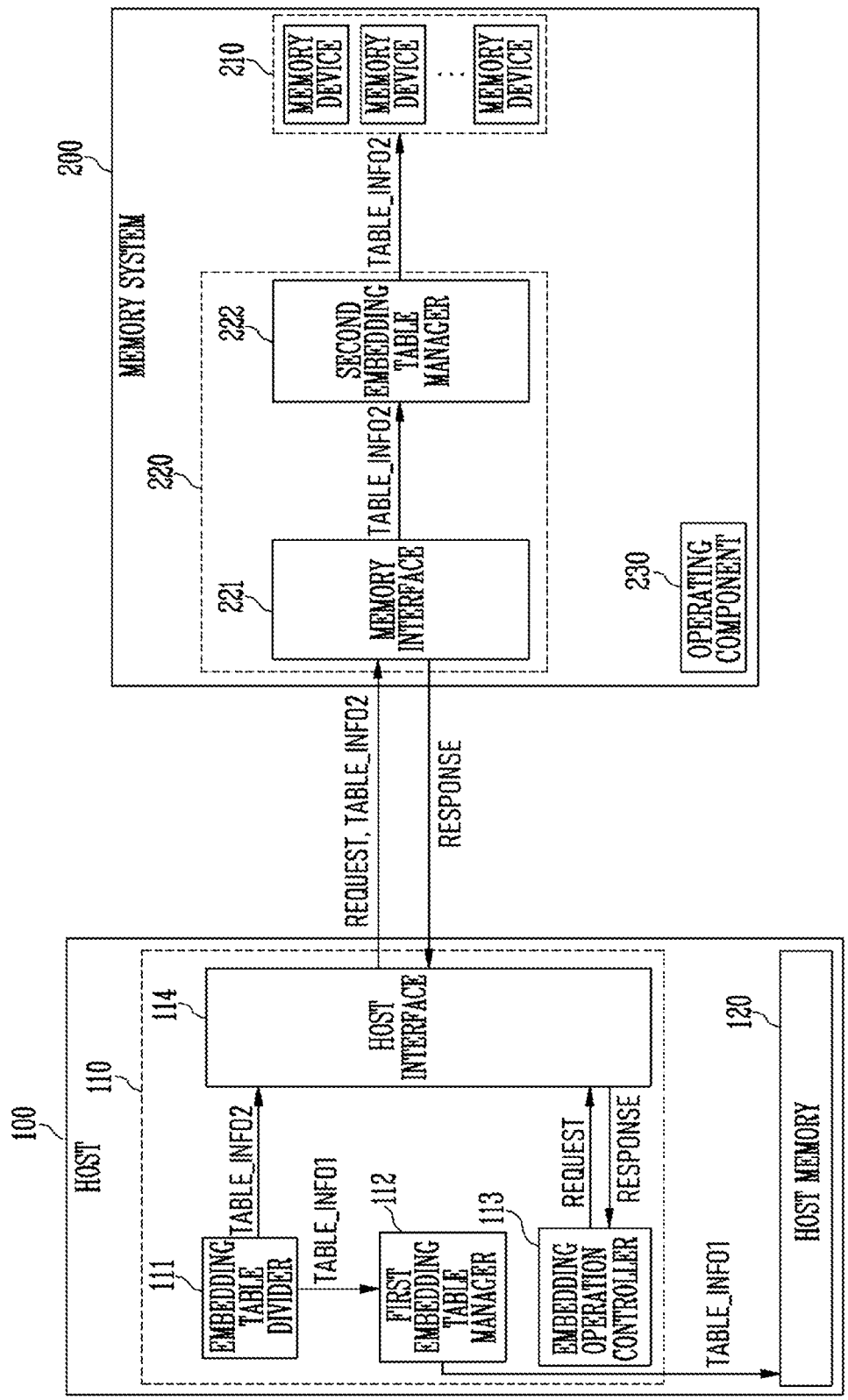
FIG. 8 illustrates an operation of generating an embedding table according to an embodiment of the present disclosure.

FIG. 8 illustrates an operation of generating an embedding table according to an embodiment of the present disclosure.

Referring to FIG. 8, the embedding table divider 111 may divide the plurality of feature tables into the first feature table group and the second feature table group. Thereafter, the embedding table divider 111 may provide information on the first feature table group TABLE_INFO1 to the first embedding table manager 112.

The first embedding table manager 112 may generate the first embedding table based on the information on the first feature table group TABLE_INFO1. For example, the first embedding table manager 112 may control the host memory 120 to allocate a memory area in which the first embedding table is to be stored. After allocating the memory area, the host memory 120 may store a zero value, a random value, or the like in the allocated memory area. Although an initial embedding table is configured of dummy data such as the zero value or the random value, the embedding table may subsequently be updated through embedding learning.

In addition, the embedding table divider 111 may provide information on the second feature table group TABLE_INFO2 to the memory system 200 through the host interface 114. For example, the embedding operation controller 113 may request the generation operation of the second embedding data to the memory system 200 through the host interface 114. The host interface 114 may provide a request REQUEST for the generation operation and the information on the second feature table group TABLE_INFO2 to the memory interface 221. The memory interface 221 may provide the information on the second feature table group TABLE_INFO2 to the second embedding table manager 222.

The second embedding table manager 222 may generate the second embedding table based on the information on the second feature table group TABLE_INFO2. For example, the second embedding table manager 222 may receive information on a size of the second embedding table from the host 100 in response to the request REQUEST for the generation operation. The second embedding table manager 222 may allocate the memory area to store the second embedding table based on the information on the size of the second embedding table. For example, the second embedding table manager 222 may control the plurality of memory devices 210 to allocate the memory area to store the second embedding table. After allocating the memory area, the plurality of memory devices 210 may store a zero value, a random value, or the like in the allocated memory area. Although an initial embedding table is configured of dummy data such as the zero value or the random value, the embedding table may be subsequently updated through embedding learning.

After generating the second embedding table, the memory interface 221 may provide a response RESPONSE corresponding to the request of the generation operation to the embedding operation controller 113 through the host interface 114. In addition, the memory interface 221 may provide an address of the allocated memory area to the embedding operation controller 113 through the response RESPONSE.

Figure 9:
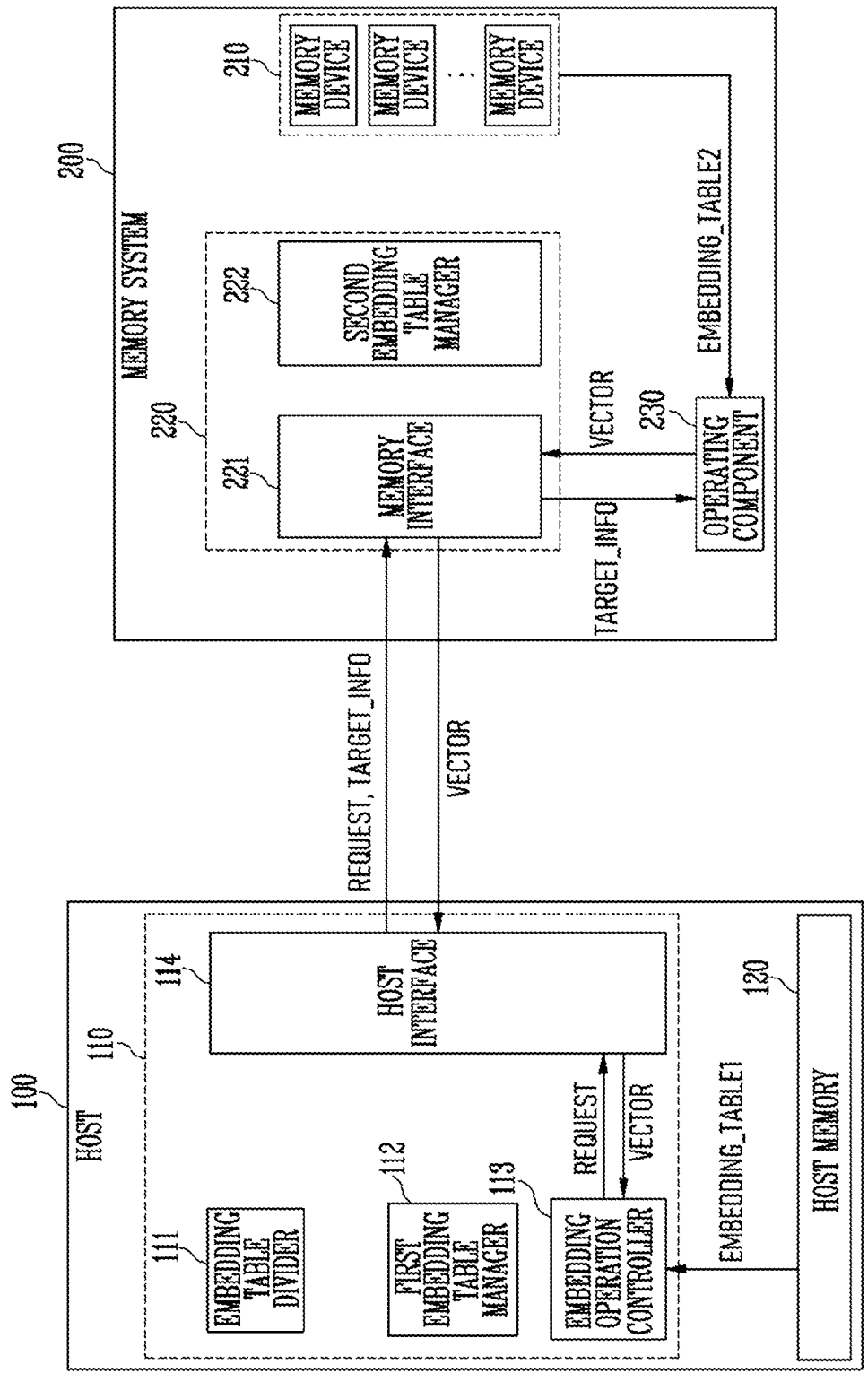
FIG. 9 illustrates an operation of obtaining an embedding vector according to an embodiment of the present disclosure.

FIG. 9 illustrates an operation of obtaining an embedding vector according to an embodiment of the present disclosure.

Referring to FIG. 9, when the feature table including the target element is included in the first feature table group, the embedding operation controller 113 may perform the embedding operation based on the first embedding table EMBEDDING_TABLE1. At this time, the target element may indicate an element for which the embedding vector is to be obtained. For example, the embedding operation controller 113 may read the first embedding table EMBEDDING_TABLE1 from the host memory 120 to perform the embedding operation. The embedding operation controller 113 may obtain the embedding vector VECTOR for the target element through the embedding operation. In an embodiment, the embedding operation may indicate a multiplication operation between a one-hot vector corresponding to the target element and the embedding table. However, the embedding operation using the one-hot vector is merely an illustrative embodiment, and the embedding operation may be performed through various other techniques known in the art according to an embodiment.

When the feature table including the target element is included in the second feature table group, the embedding operation controller 113 may send a request for the embedding vector VECTOR of the target element to the memory system 200. For example, the embedding operation controller 113 may provide a request REQUEST of the embedding vector and information related to the target element TARGET_INFO to the memory interface 221 through the host interface 114. In an embodiment, the information related to the target element TARGET_INFO may include a one-hot vector corresponding to the target element, an address in which the embedding vector of the target element is stored, and the like, but embodiments are not limited thereto.

The operating component 230 may perform the embedding operation based on the second embedding table EMBEDDING_TABLE2 in response to the request REQUEST for the embedding vector VECTOR of the target element. For example, the operating component 230 may read the second embedding table EMBEDDING_TABLE2 from the plurality of memory devices 210 to perform the embedding operation. The operating component 230 may obtain the embedding vector VECTOR of the target element through the embedding operation using the information related to the target element TARGET_INFO and the second embedding table EMBEDDING_TABLE2. The operating component 230 may provide the obtained embedding vector VECTOR to the host 100 through the memory interface 221.

Figure 10:
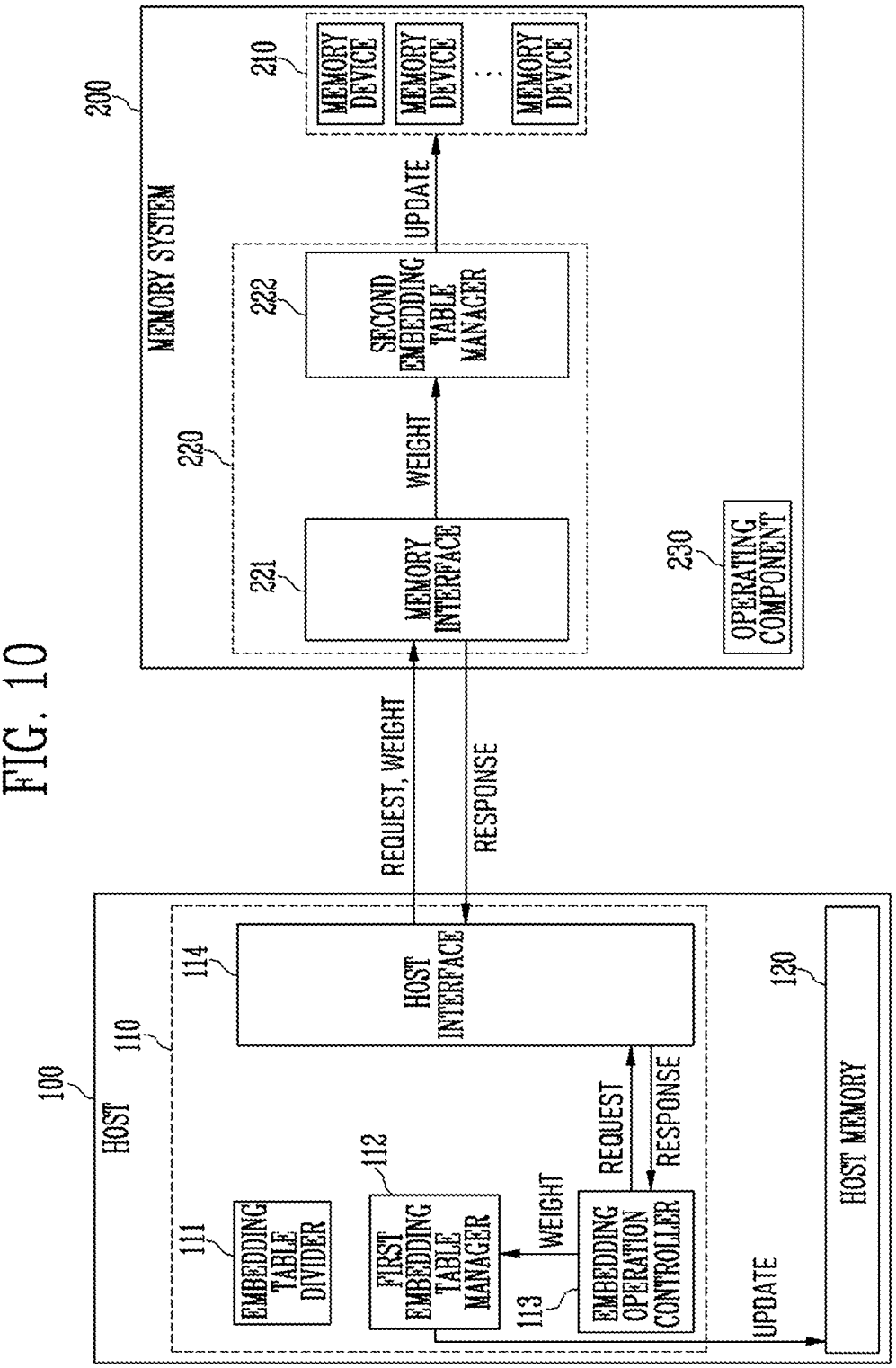
FIG. 10 illustrates an operation of updating an embedding table according to an embodiment of the present disclosure.

FIG. 10 illustrates an operation of updating an embedding table according to an embodiment of the present disclosure.

Referring to FIG. 10, the embedding operation controller 113 may update the first embedding table based on the weight WEIGHT obtained through embedding learning. For example, the embedding operation controller 113 may control the first embedding table manager 112 to update the first embedding table based on the weight WEIGHT. The first embedding table manager 112 may update the first embedding table stored in the host memory 120 based on the weight WEIGHT.

In addition, the embedding operation controller 113 may send a request for an update operation UPDATE of the second embedding table based on the weight WEIGHT to the memory system 200. For example, the embedding operation controller 113 may provide a request REQUEST for the update operation UPDATE and the weight WEIGHT to the memory interface 221 through the host interface 114.

The second embedding table manager 222 may update the second embedding table stored in the plurality of memory devices 210 based on the weight WEIGHT. After the update operation UPDATE of the second embedding table is completed, the memory system 200 may provide a response RESPONSE corresponding to the request REQUEST of the update operation UPDATE to the embedding operation controller 113 through the host interface 114.

Figure 11:
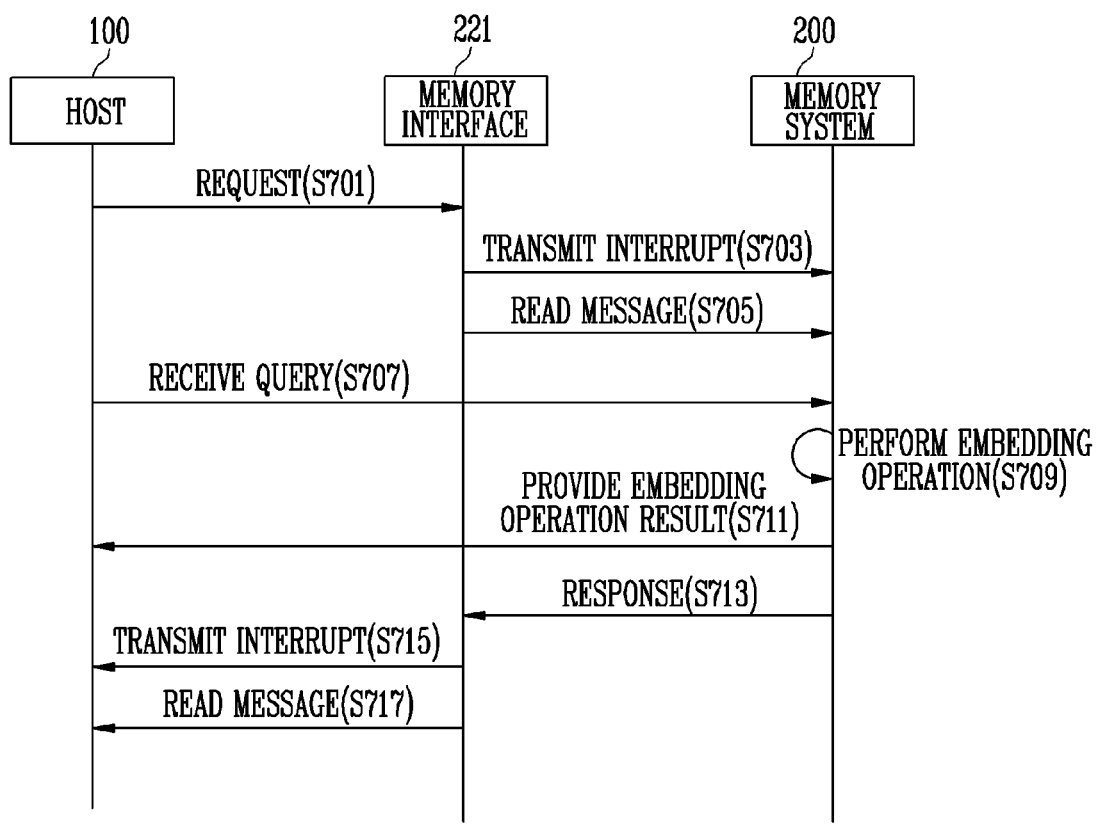
FIG. 11 is a flowchart illustrating a communication process between a host and a memory system according to an embodiment of the present disclosure.

FIG. 11 is a flowchart illustrating a communication process between a host and a memory system (for example, the host 100 and the memory system 200 of FIG. 6) according to an embodiment of the present disclosure.

In an embodiment, in order to manage the communication between the host 100 and the memory system 200, the memory interface 221 may include a mailbox and a direct memory access (DMA) device, where the DMA device is configured to transfer data between the memory system 200 and the host memory 120.

In step S701, the host 100 may send a request to read a message to the memory interface 221. At this time, the message may include information for instructing an embedding operation. In an embodiment, the embedding operation may be any one of the embedding table generation operation, the inference operation, and the training operation. For example, when the host 100 completes preparation of a query for the embedding operation, the host 100 may allocate the host memory 120 and store the query. The host 100 may generate the message based on the query and transmit the message to the memory system 200. For example, the host 100 may provide the message to the mailbox of the memory interface 221 and then send a request to the memory system 200 to read the message.

In step S703, in response to receiving the request from the host 100, the memory interface 221 may transmit an interrupt to the memory system 200 (for example, to the memory controller 220).

In step S705, in response to the interrupt, the memory system 200 may read the message from the mailbox of the memory interface 221. The memory system 200 may decode the message and allocate a memory area according to a size of the query or the gradient.

In step S707, the memory system 200 may receive data stored in the host memory 120 through the memory interface 221 by referring to a source address included in the message.

At this time, the data stored in the host memory 120 may be the query or the gradient. For example, the memory system 200 may receive the data stored in the host memory 120 through the DMA device of the memory interface 221.

In step S709, the memory system 200 may perform the embedding operation.

In step S711, the memory system 200 may provide a result of the embedding operation to the host 100. For example, the memory system 200 may obtain an address of the host memory 120 to store the result from the message, and provide the result to the address of the corresponding host memory 120. In an embodiment, the memory system 200 may provide the result to the host memory using the DMA device of the memory interface 221.

In step S713, when the result is stored in the address of the host memory 120, the memory system 200 may respond to the memory interface 221. Specifically, the memory system 200 may provide the message corresponding to a response to the mailbox.

In step S715, when receiving the message corresponding to the response, the memory interface 221 may transmit an interrupt to the host 100.

In step S717, the host 100 may read the message corresponding to the response from the mailbox of the memory interface 221.

Figure 12:
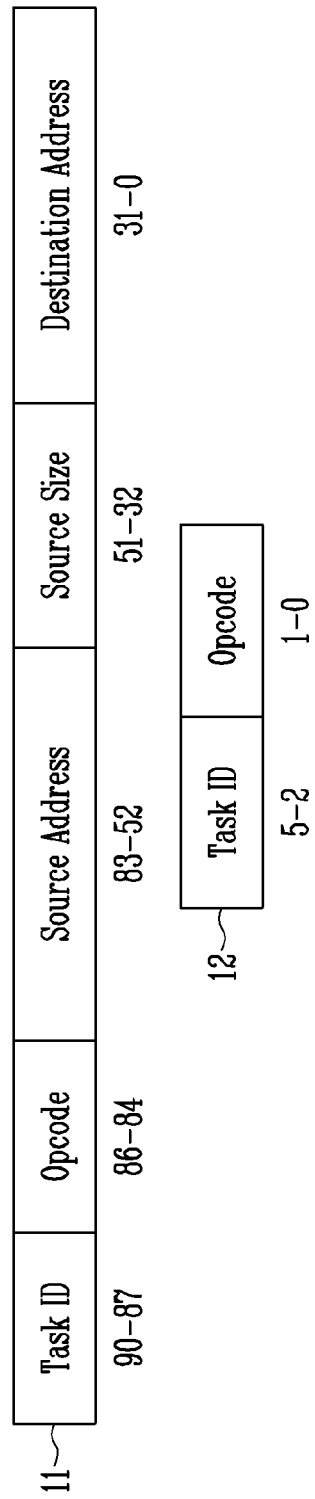
FIG. 12 illustrates communication packets that may be communicated between a host and a memory system according to an embodiment of the present disclosure.

FIG. 12 illustrates communication packets that may be communicated between a host and a memory system, such as the host 100 and the memory system 200 of FIG. 1, according to an embodiment of the present disclosure.

A first communication packet 11 may be a message transmitted from the host 100 to the memory system 200. The first communication packet 11 may include 'Task ID', 'Opcode', 'Source Address', 'Source Size', and 'Destination Address' fields.

The first communication packet 11 may be configured of a total of 91 bits, and 4 bits may be allocated to the 'Task ID'. The 'Task ID' may indicate an operation state of the host 100. For example, the 'Task ID' may indicate whether an operation of the host 100 is running or terminated. The host 100 may reconfigure an operation of the memory system 200 by using the 'Task ID'.

In addition, 3 bits may be allocated to the 'Opcode', and data indicating one of a plurality of embedding operations may be included therein. Specifically, the host 100 may use the 'Opcode' to indicate one of the embedding table generation operation (or an initial setting operation), the inference operation, and the training operation. Other operations may also be identified by the 'Opcode.'

In addition, 32 bits may be allocated to the 'Source Address', and information on a source address of the query or the gradient may be included therein. Specifically, the host 100 may include information on an address of the query or an address of the gradient to be transmitted to the memory system 200 from the host memory 120 by using the 'Source Address'.

In addition, 20 bits may be allocated to the 'Source Size', and information on the size of the query or the gradient may be included. In addition, 32 bits may be allocated to the 'Destination Address' which may include an address of the host memory 120 to receive a result of performing an internal operation by the memory system 200.

The host 100 may communicate with the memory system 200 using the first communication packet 11. In addition, in response to receiving the first communication packet 11 from the host 100, the memory system 200 may transmit a second communication packet 12 as a response message. Here, the second communication packet 12 may include the 'Task ID' and the 'Opcode'.

Figure 13:
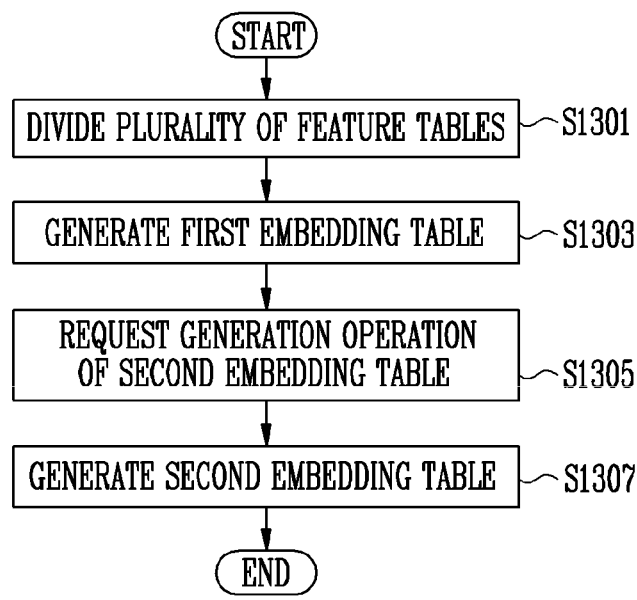
FIG. 13 is a flowchart illustrating a process of operating a computing system according to an embodiment of the present disclosure.

FIG. 13 is a flowchart illustrating a process of operating a computing system according to an embodiment of the present disclosure.

The process shown in FIG. 13 may be performed, for example, by the computing system 10 shown in FIG. 1 or the computing system 20 shown in FIG. 2. Hereinafter, for convenience of description, a description is given based on the computing system 10 shown in FIG. 1.

Referring to FIG. 13, in step S1301, the host 100 may divide the plurality of feature tables into a first feature table group and a second feature table group.

At this time, the host 100 may divide the plurality of feature tables into the first feature table group and the second feature table group based on the number of elements included in each of the plurality of feature tables.

In step S1303, the host 100 may generate the first embedding table configured of the first feature table group. The first embedding table may be generated in a host memory of the host 100.

In step S1305, the host 100 may send a request for the generation operation of the second embedding table configured of the second feature table group to the memory system 200.

In step S1307, the memory system 200 may generate the second embedding table according to the request of the generation operation of the second embedding table provided from the host 100.

At this time, the memory system 200 may receive information on the size of the second embedding table from the host 100 and allocate the memory area to store the second embedding table based on the information on the size. The memory area may be allocated in one or more memory devices 210 of the memory system 200.

Figure 14:
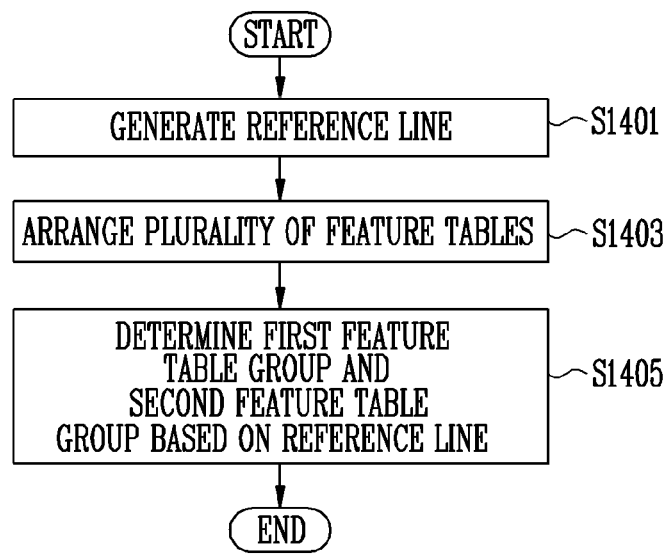
FIG. 14 is a flowchart illustrating a process of dividing a plurality of feature tables according to an embodiment of the present disclosure.

FIG. 14 is a flowchart illustrating a process of dividing a plurality of feature tables according to an embodiment of the present disclosure.

The process shown in FIG. 14 may be an embodiment of step S1301 of FIG. 13.

The process shown in FIG. 14 may be performed, for example, by the host 100 shown in FIG. 1 or the host 100 shown in FIG. 2.

Referring to FIG. 14, in step S1401, the host 100 may generate the reference line based on the number of a plurality of feature tables and the number of all elements included in the plurality of feature tables.

In step S1403, the host 100 may sort the plurality of feature tables in the ascending order based on the number of elements included in each of the plurality of feature tables.

In step S1405, the host 100 may determine the feature tables among the plurality of feature tables having respective numbers of elements below respective corresponding values of the reference line as being in the first feature table group, and determine the feature tables among the plurality of feature tables having respective numbers of elements above respective corresponding values of the reference line as being in the second feature table group.

What is claimed is:

1. A computing system comprising:
a host configured to:
divide a plurality of feature tables into a first feature table group and a second feature table group, each feature table including a respective plurality of embedding vectors for a respective plurality of elements, generate a first embedding table configured of the first feature table group, and provide a request of a generation operation of a second embedding table configured of the second feature table group to a memory system; and the memory system configured to generate the second embedding table according to the request of the generation operation provided from the host;

wherein the host divides the plurality of feature tables into the first feature table group and the second feature table group based on the respective number of elements included in each of the plurality of feature tables, and wherein each of the plurality of feature tables includes embedding vectors for elements included in a corresponding feature, which is generated based on a similarity between the elements included in the corresponding feature.

2. The computing system of claim 1, wherein the host generates a reference line based on the number of the plurality of feature tables and the number of all elements included in the plurality of feature tables, and divides the plurality of feature tables into the first feature table group and the second feature table group based on the reference line.

3. The computing system of claim 2, wherein the reference line is generated according to an arithmetic average determined using the number of the plurality of feature tables and the number of the all elements.

4. The computing system of claim 2, wherein the host sorts the plurality of feature tables in an ascending order based on the number of the elements included in each of the plurality of feature tables, determines feature tables among the plurality of feature tables having respective numbers of elements below respective corresponding values of the reference line as being in the first feature table group, and determines feature tables among the plurality of feature tables having respective numbers of elements above respective corresponding values of the reference line as the being in second feature table group.

5. The computing system of claim 1, wherein in response to receiving the request of the generation operation the memory system:

receives information on a size of the second embedding table from the host, and allocates a memory area to store the second embedding table based on the information on the size, wherein the memory system provides an address of the memory area to the host after allocating the memory area.

6. The computing system of claim 1, wherein the host is further configured to:

update the first embedding table based on a weight obtained through embedding learning, and send a request for an update operation of the second embedding table based on the weight to the memory system.

7. The computing system of claim 1, wherein when a feature table including a target element is included in the first feature table group, the host performs the embedding operation based on the first embedding table to obtain an embedding vector of the target element.

8. The computing system of claim 1, wherein when a feature table including a target element is included in the second feature table group, the host sends a request for an embedding vector of the target element to the memory system, wherein in response to the request for the embedding vector of the target element, the memory system:

performs the embedding operation based on the second embedding table to obtain the embedding vector of the target element, and provides the obtained embedding vector to the host.

9. The computing system of claim 1, wherein the memory system comprises:

a plurality of memory devices to store the second embedding table;

a memory interface to relay packets between the host and the memory system;

an embedding table manager to generate the second embedding table; and an operating component to perform the embedding operation based on the second embedding table.

10. A host comprising:

an embedding table divider configured to divide a plurality of feature tables into a first feature table group and a second feature table group, each feature table including a respective plurality of embedding vectors for a respective plurality of elements;

an embedding table manager configured to generate a first embedding table configured of the first feature table group; and an embedding operation controller configured to send request for a generation operation of a second embedding table configured of the second feature table group to a memory system, wherein the embedding table divider divides the plurality of feature tables into the first feature table group and the second feature table group based on the number of elements included in each of the plurality of feature tables, and wherein each of the plurality of feature tables includes embedding vectors for elements included in a corresponding feature, which is generated based on a similarity between the elements included in the corresponding feature.

11. The host of claim 10, wherein the embedding table divider generates a reference line based on the number of the plurality of feature tables and the number of all elements included in the plurality of feature tables, and divides the plurality of feature tables into the first feature table group and the second feature table group based on the reference line, wherein the reference line is generated according to an arithmetic average determined using the number of the plurality of feature tables and the number of the all elements.

12. The host of claim 11, wherein the embedding table divider sorts the plurality of feature tables in an ascending order based on the number of the elements included in each of the plurality of feature tables, determines feature tables among the plurality of feature tables having respective numbers of elements below respective corresponding values of the reference line as being in the first feature table group, and determines feature tables among the plurality of feature tables having respective numbers of elements above respective corresponding values of the reference line as being in the second feature table group.

13. The host of claim 10, wherein the embedding table manager is further configured to update the first embedding table based on a weight obtained through embedding learning, and the embedding operation controller is further configured to send a request for an update operation of the second embedding table based on the weight to the memory system.

14. The host of claim 10, wherein when a feature table including a target element is included in the first feature table group, the embedding operation controller performs the embedding operation based on the first embedding table to obtain an embedding vector of the target element.

15. The host of claim 10, wherein when a feature table including a target element is included in the second feature table group, the embedding operation controller sends a request for an embedding vector of the target element to the memory system, and receives the embedding vector of the target element from the memory system.

16. A computing system comprising:

an embedding table divider configured to divide a plurality of feature tables into a plurality of feature table groups, each feature table including a respective plurality of embedding vectors for a respective plurality of elements;

a plurality of operation processing devices each configured to generate an embedding table configured of any one of the plurality of feature table groups, wherein the embedding table divider divides the plurality of feature tables into the plurality of feature table groups based on the number of elements included in each of the plurality of feature tables, and wherein each of the plurality of feature tables includes embedding vectors for elements included in a corresponding feature, which is generated based on a similarity between the elements included in the corresponding feature.

17. The computing system of claim 16, wherein the plurality of operation processing devices includes a host and a plurality of memory systems.

* * * * *